United States Patent
Benayoun et al.

(10) Patent No.: US 7,142,515 B2
(45) Date of Patent: *Nov. 28, 2006

(54) EXPANDABLE SELF-ROUTE MULTI-MEMORY PACKET SWITCH WITH A CONFIGURABLE MULTICAST MECHANISM

(75) Inventors: Alain Benayoun, Cagnes sur Mer (FR); Patrick Michel, La Gaude (FR); Gilles Toubol, Villeneuve Loubei (FR)

(73) Assignee: International Business Machines Corporation, Armonk, NY (US)

( * ) Notice: Subject to any disclaimer, the term of this patent is extended or adjusted under 35 U.S.C. 154(b) by 983 days.

This patent is subject to a terminal disclaimer.

(21) Appl. No.: 10/043,028

(22) Filed: Jan. 9, 2002

(65) Prior Publication Data

US 2002/0089981 A1    Jul. 11, 2002

(30) Foreign Application Priority Data

Jan. 11, 2001    (EP)    ................................. 01480002

(51) Int. Cl.
  *G06F 13/36*    (2006.01)
(52) U.S. Cl. ..................................... 370/235; 370/428
(58) Field of Classification Search ................ 370/390, 370/414, 236, 370, 389, 360, 363, 374, 380, 370/392, 413, 416
  See application file for complete search history.

(56) References Cited

U.S. PATENT DOCUMENTS

| | | | | |
|---|---|---|---|---|
| 5,467,347 A | * | 11/1995 | Petersen ...................... | 370/230 |
| 5,689,500 A | * | 11/1997 | Chiussi et al. .............. | 370/235 |
| 5,923,654 A | * | 7/1999 | Schnell ........................ | 370/390 |
| 6,032,205 A | * | 2/2000 | Ogimoto et al. ............. | 710/33 |
| 6,314,487 B1 | * | 11/2001 | Hahn et al. ................. | 710/317 |
| 6,349,097 B1 | * | 2/2002 | Smith .......................... | 370/390 |
| 6,449,274 B1 | * | 9/2002 | Holden et al. .............. | 370/392 |
| 6,449,283 B1 | * | 9/2002 | Chao et al. .................. | 370/461 |
| 6,452,924 B1 | * | 9/2002 | Golden et al. .............. | 370/352 |
| 6,487,171 B1 | * | 11/2002 | Honig et al. ................. | 370/235 |

(Continued)

OTHER PUBLICATIONS

IEEE/ACM Transactions on Networking (TON) archivevol. 2, Issue 4 (Aug. 1994) table of contentspp. 352-362 Year of Publication: 1994 ISSN:1063-6692 Authors Zitterbart et al.*

(Continued)

*Primary Examiner*—Hassan Kizou
*Assistant Examiner*—Salman Ahmed
(74) *Attorney, Agent, or Firm*—Sawyer Law Group LLP (57) ABSTRACT

Data transmission system comprising a plurality of Local Area Networks (LANs) (10-1 to 10-4) interconnected by a hub (12) including the same plurality of LAN adapters (16-1 to 16-4) respectively connected to the LANs and a packet switch (14) comprising at least a packet switch module interconnecting all LAN adapters wherein a packet transmitted by any adapter to the packet switch includes a header containing at least the address of the adapter to which the packet is forwarded. The system comprises a memory block at each crosspoint of the switch module including memory control means for determining from the header of the received data packet whether the packet is to be forwarded to the output port associated with the crosspoint and a data memory unit for storing at least the data packet into the data memory unit before sending it to the output port. The memory control means analyzes all the bytes following the header when it includes a specific configuration indicating that the packet is a multicast address packet preceding a multicast frame in order to determine whether the packets of the multicast frame are to be forwarded to the output port.

20 Claims, 10 Drawing Sheets

U.S. PATENT DOCUMENTS

| | | | |
|---|---|---|---|
| 6,487,213 B1 * | 11/2002 | Chao | 370/418 |
| 6,574,232 B1 * | 6/2003 | Honig et al. | 370/413 |
| 6,667,984 B1 * | 12/2003 | Chao et al. | 370/414 |
| 6,798,744 B1 * | 9/2004 | Loewen et al. | 370/235 |
| 6,819,675 B1 * | 11/2004 | Benayoun et al. | 370/412 |
| 6,904,046 B1 * | 6/2005 | Benayoun et al. | 370/414 |

OTHER PUBLICATIONS

Architectural Choices in Large Scale ATM Switches Jonathan Turner and Naoaki Yamanaka WUCS 97-21 May 1, 1997 Department of Computer Science Campus Box 1045 Washington University One Brookings Drive St. Louis, MO 63130-4899*

* cited by examiner

EXPANDABLE SELF-ROUTE MULTI-MEMORY PACKET SWITCH WITH A CONFIGURABLE MULTICAST MECHANISM

TECHNICAL FIELD

The present invention relates to the transmission of data packets such as ATM packets between Local Area Networks (LAN) interconnected by a switch engine and relates in particular to a data transmission system including an expandable self-route multi-memory packet switch provided with a configurable multicast mechanism.

BACKGROUND

Local Area Networks (LAN) such as Ethernet or token-ring networks, are generally interconnected through hubs. The hub is a system made of LAN adapters that communicate together through a switch card containing a switch engine. Such a switch engine can be either a shared memory switch or a crossbar switch.

The shared memory switch is a device wherein the packets received by the input ports are stored into a memory at locations the addresses of which are determined by queues containing the packet destination addresses, the packets being transmitted on the output ports as the destination addresses are dequeued. Although such a switch incurs a very low cell-lost rate, it presents a bottleneck due to the requirement of the memory bandwidth, the segregation of the memory space and the centralized control of the memory which causes the switch performance to degrade as the size of the switch increases. A traditional approach to design a large shared memory switch has been to first design a feasible size shared memory switch and then to interconnect a plurality of such modules in order to build a large switch. This general scheme of switch growth is known to cause degradation in performance of shared memory architecture as the switch grows in size insofar as the memory access controller will have to increase the number of all centralized control functions and memory operations thereby reducing drastically the access to the shared memory. A growable switch approach packet switch architecture is a plurality of shared memory switches organized in a single stage preceded by a buffer-less interconnection network. This approach does not allow global sharing of memory space along all its inputs and outputs. It is known that this approach does not provide the best memory utilization as possible for a memory belonging to a group of output ports to overflow under unbalanced or bursty traffic conditions.

The other technique, the crossbar switch, does not use a shared memory to store the data packets. In such a switch, the data are stored in the adapters and the switching data connection is established by sending requests to a control module which determines whether it is possible to satisfy the requests taking into account an algorithm defining the best data connection to establish at each time. The main drawback of this approach is the use of a centralized control module which has to know the complete switching topology of the system and can become impossible to control when the switch grows in size. The size growth and therefore the increase number of input and output ports requires to redesign the centralized control module. Furthermore, it is impossible with this approach to achieve a speed expansion without redesigning the centralized control module.

In both switch approaches mentioned above, it is difficult to implement the multicast transmission. Indeed, in a shared memory switch, the multicast function is established by the duplication of the memory address in the data output queuing buffers which is carried out by using multicast routing tables or bit map addressing. The drawback of the technique is the maintenance and the updating of the routing tables by the adapter insofar as this is performed by accessing the routing table address through an external interface bus.

In the crossbar switch, the multicast function is carried out by the duplication of the requests to send. Such a duplication can be made by the adapter or by sending requests associated with a bit map multicast routing address. In both cases, this causes contention problems in the connection and switching limitations due to the limited number of bits being used.

SUMMARY OF THE INVENTION

Accordingly, the main object of the invention is to provide a packet switch wherein the multicast function does not require use of multicast routing tables for the duplication of the memory addresses or to duplicate the requests to send.

The invention relates, therefore, to a data transmission system comprising a plurality of Local Area Networks (LANs) interconnected by a hub including the same plurality of LAN adapters respectively connected to said LANs and a packet switch comprising at least a packet switch module interconnecting all LAN adapters wherein a packet transmitted by any adapter to the packet switch includes a header containing at least the address of the adapter to which the packet is forwarded. The switch module comprises a plurality of input ports and a plurality of output ports both being respectively connected to the LAN adapters, each couple of an input port and an output port defining a crosspoint within the switch module. The system comprises a memory block located at each crosspoint of the switch module, which includes memory control means for determining from the header of the received data packet whether the packet is to be forwarded to the output port associated with the crosspoint and a data memory unit for storing at least the data packet into the data memory unit before sending it to the output port in such a case. The memory control means analyzes all the bytes following the header when the header includes a specific configuration indicating that the packet is a multicast address packet preceding a multicast frame in order to determine whether the packets of the multicast frame are to be forwarded to the output port corresponding to the memory block.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
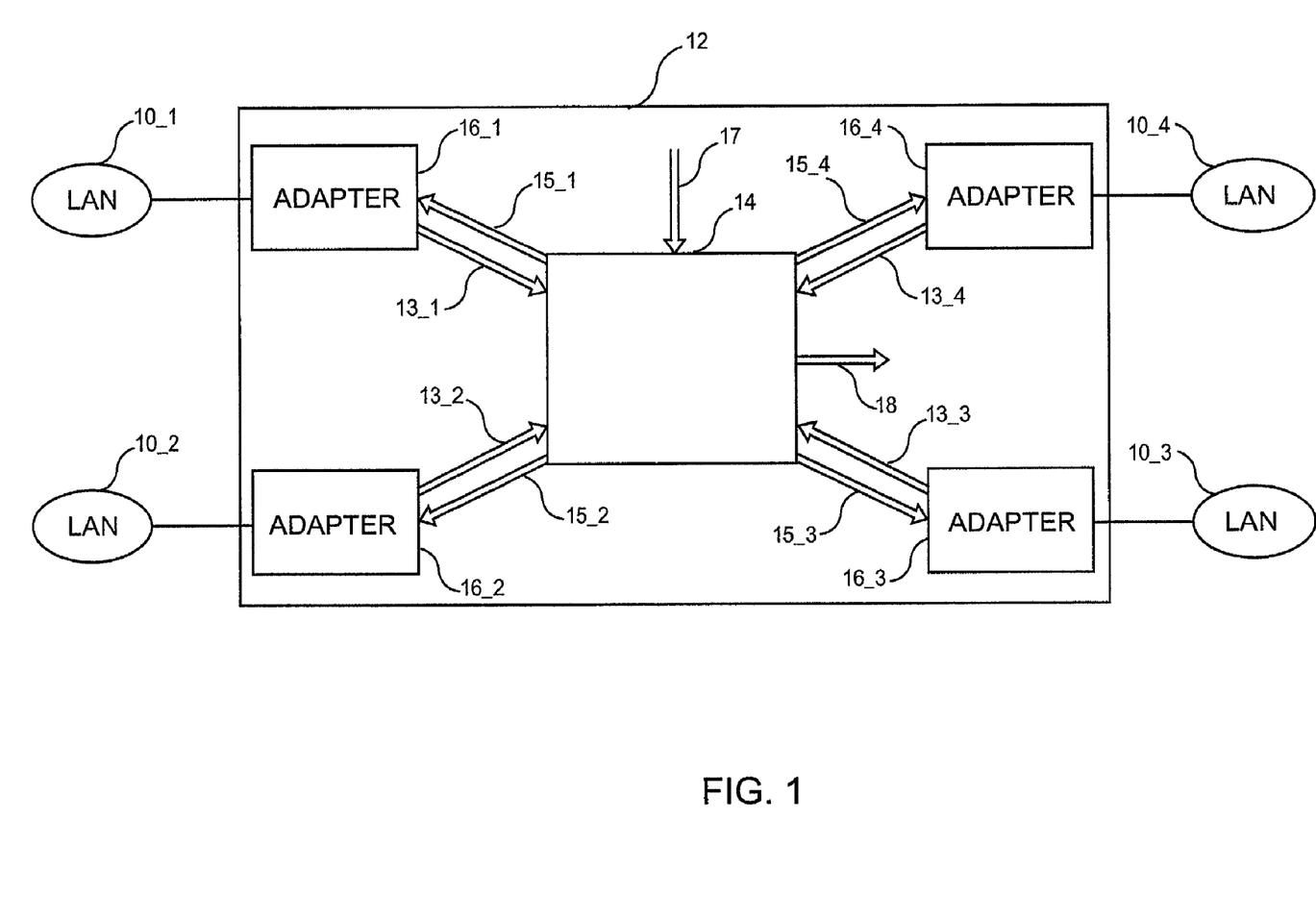
FIG. 1 is a schematic block diagram of a data transmission system including four LANs interconnected by a hub according to the principles of the invention.

The invention is implemented in an environment illustrated in FIG. 1 wherein a plurality of Local Area Networks (LAN) 10-1, 10-2, 10-3, 10-4 are interconnected together by a hub 12 including a Packet switch 14. The Local Area Networks may be of the type ATM, Ethernet, or token-ring. Each LAN is connected to the packet switch 14 in the hub 12 by means of LAN adapter 16-1 for LAN 10-1, 16-2 for LAN 10-2, 16-3 for LAN 10-3 and 16-4 for LAN 10-4. Each adapter is connected to the packet switch 14 by means of a data bus in 13 (bus 13-1 to 13-4 and a data bus out 15 (bus 15-1 to 15-4). Connected to the packet switch 14 are the input expansion bus 17 and the output expansion bus 18 which are respectively used for increasing the number of input ports and the number of output ports as explained hereafter.

Data bus in 13 carries the data packets coming from the input adapter and data bus out 15 carries the outgoing data packets to the output adapter. As explained hereafter, each incoming packet includes a self-routing header inserted by the adapter, this header being used to independently process the data packet through the different stages of the switch module.

Figure 2:
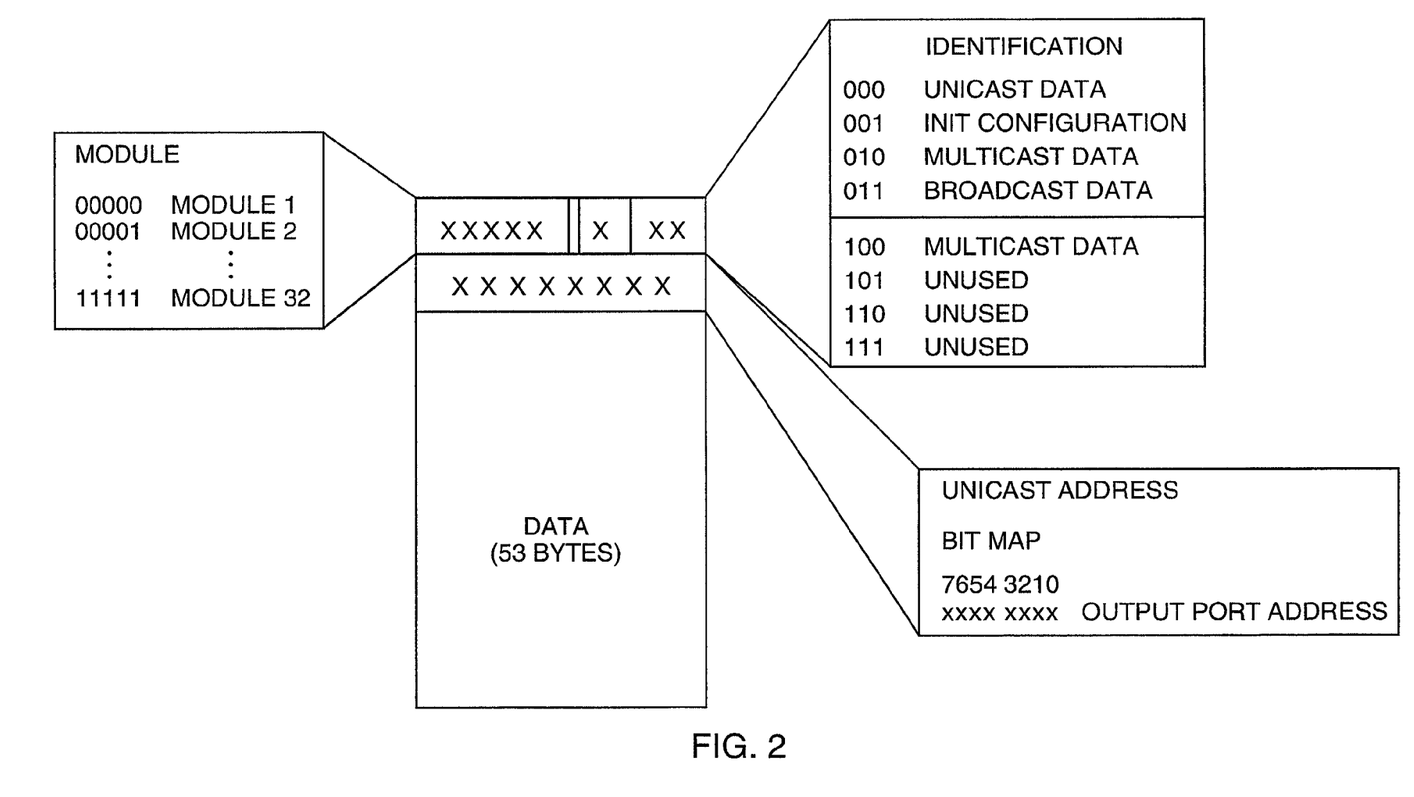
FIG. 2 represents schematically a data packet with the header of two bytes added by the adapter which is transmitted through a packet switch according to the invention.

FIG. 2 represents the format of the data packets exchanged between the LAN adapters through the packet switch. It is assumed that the data are packets of 53 bytes. A header of 2 bytes is added to each packet by the adapter. The first byte of the header is composed of an identification field of three bits (bits 0–2) and a module address field of 5 bits (bits 3–7). The second byte of the header is used in the unicast configuration and gives in bit map the destination output port selection.

General Data Flow Structure

Figure 3:
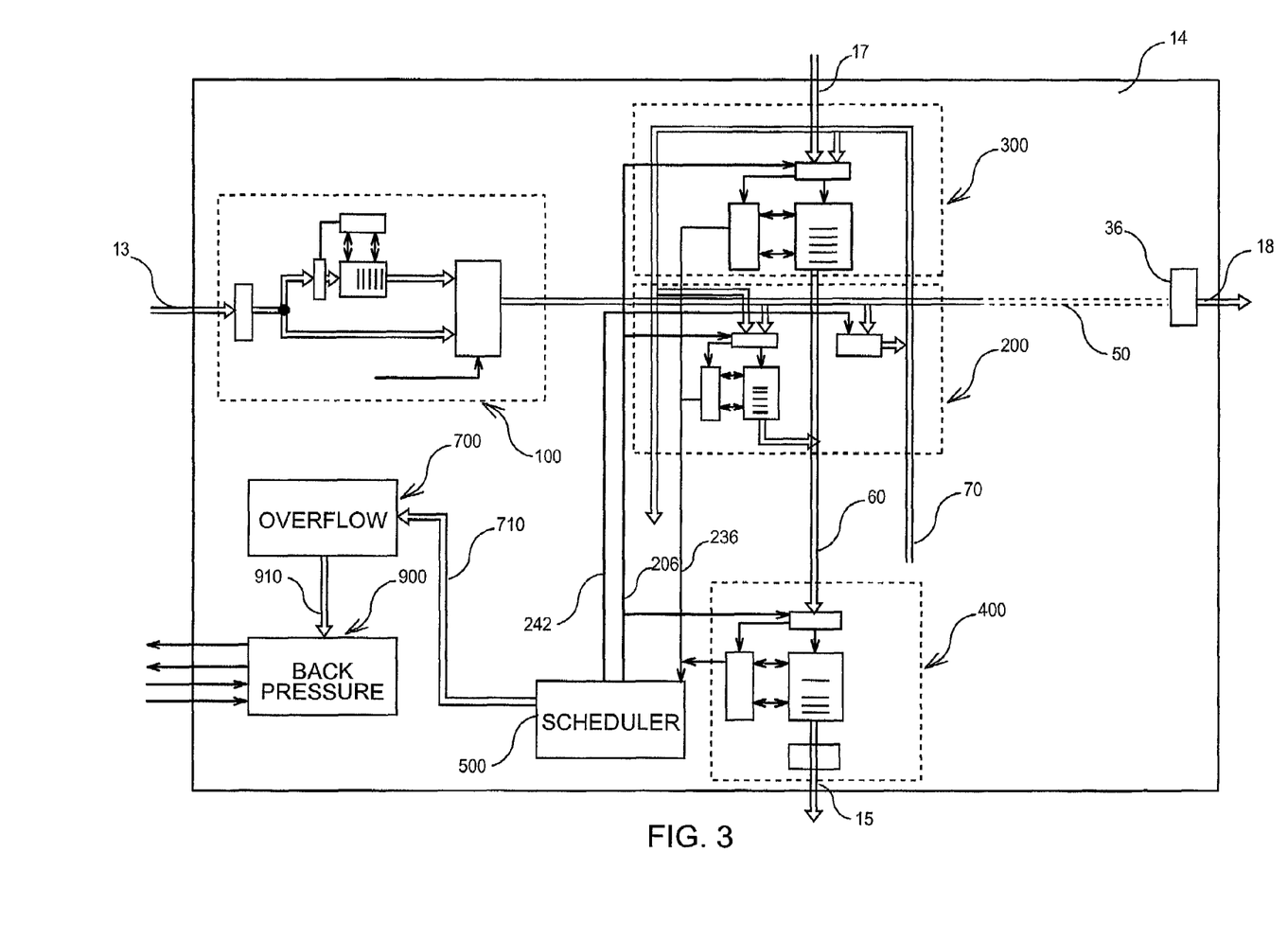
FIG. 3 is a block diagram representing the features of the packet switch being used in the packet data flow.

In reference to FIG. 3, the general data flow structure of the switch module 14 according to the invention, is composed of a plurality of input bus like data bus in 13 respectively connected to the input ports of switch and a plurality of output bus like data bus out 15 respectively connected to the output ports of the switch.

For each crosspoint such as the crosspoint defined by data bus in 13 and data bus out 15, there are an input control block 100, a memory block 200, an input expansion data block 300 and an output control block 400. The input control block is common for all memory blocks which correspond to data bus in 13 and the output control block 400 is common for all memory blocks which correspond to data bus out 15. The input expansion data block 300 is connected in input to the input expansion bus 17 and is common to all memory blocks which correspond to data bus out 15. All the memory blocks corresponding to the data bus in 13 are connected to a distributed data bus 50 itself connected to the output expansion bus 18 by means of a gate 36. All the memory blocks corresponding to data bus out 15 are connected to an output data bus 60 and to an overflow data bus 70 the function of which will be explained later.

The data packets which are received by each memory block 200 from input control block 100 are analyzed and stored into memory, and are then released to output control block 400 through output data bus 60. Then, the data packets are sent by output control block 400 over data bus out 15. All these operations are synchronized and controlled by a scheduler 500 within output control block 400 by means of control lines such as lines 206, 236 and 242.

Figure 4:
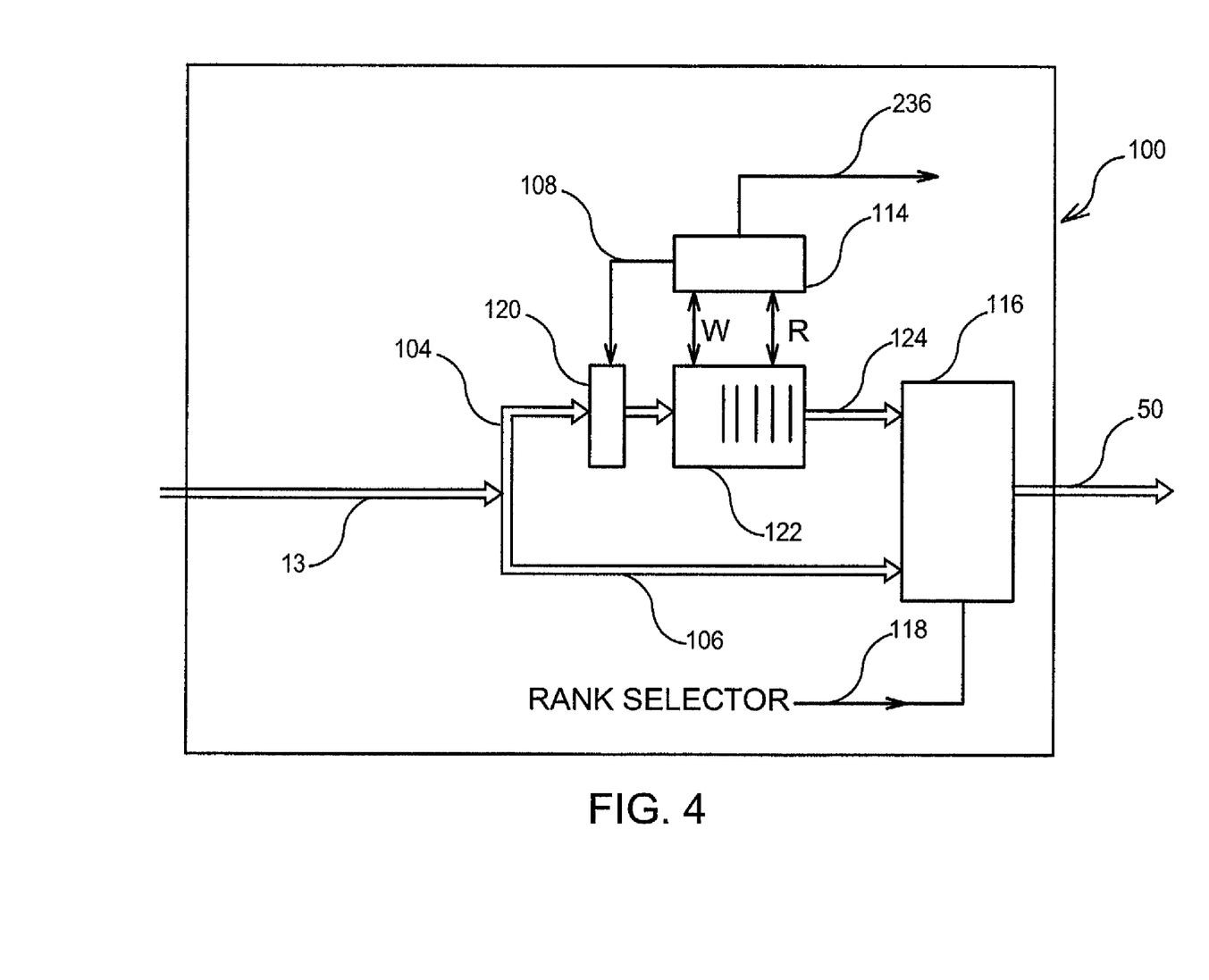
FIG. 4 is a block diagram representing an input control block of the packet switch.

As illustrated in FIG. 4, an input control block 100 comprises principally a data bus in 13 for receiving data packets and means for storing the incoming data packets according to their destination and releasing these packets into distributed data bus 50. Such means include a buffer 120 for buffering and validating the data packet received from input bus 104 and an input memory unit 122 for storing the data packets under the control of a memory control block 114. The input memory unit is preferably a memory adapted to store a plurality of data packets, the write signal being sent by memory control block 114 after validation of the data in buffer 120. When a data packet is forwarded over distributed bus 50, a read signal is sent to the memory control block 114 enabling it to know the filling level of the input memory unit 122. Assuming that input memory unit 122 is full, the data packet within buffer 120 is not allowed to be transferred into the input memory unit 122 and an overflow signal is forwarded to a scheduler on line 236 as described hereafter.

As described later, several modules can be grouped together to constitute the packet switch. For this, it is necessary to have a multiplexer 116 between the data bus in 13 and the distributed data bus 50. An input control signal 118 coming from a rank selector 800 determines the selection of the input to the multiplexer. In case of several switch modules, only the data packets received by the first module must be buffered to avoid the risk of overflow. In such a case, the multiplexer input selected by control signal 118 is the output of input memory unit 122 for the module 0 wherein data bus in 13 and the following bus 106 is directly connected to distributed data bus 50 by the multiplexer 116 for the subsequent modules. Note that the output of input memory unit 122 is also selected if there is only one switch module in packet switch 14.

Figure 5:
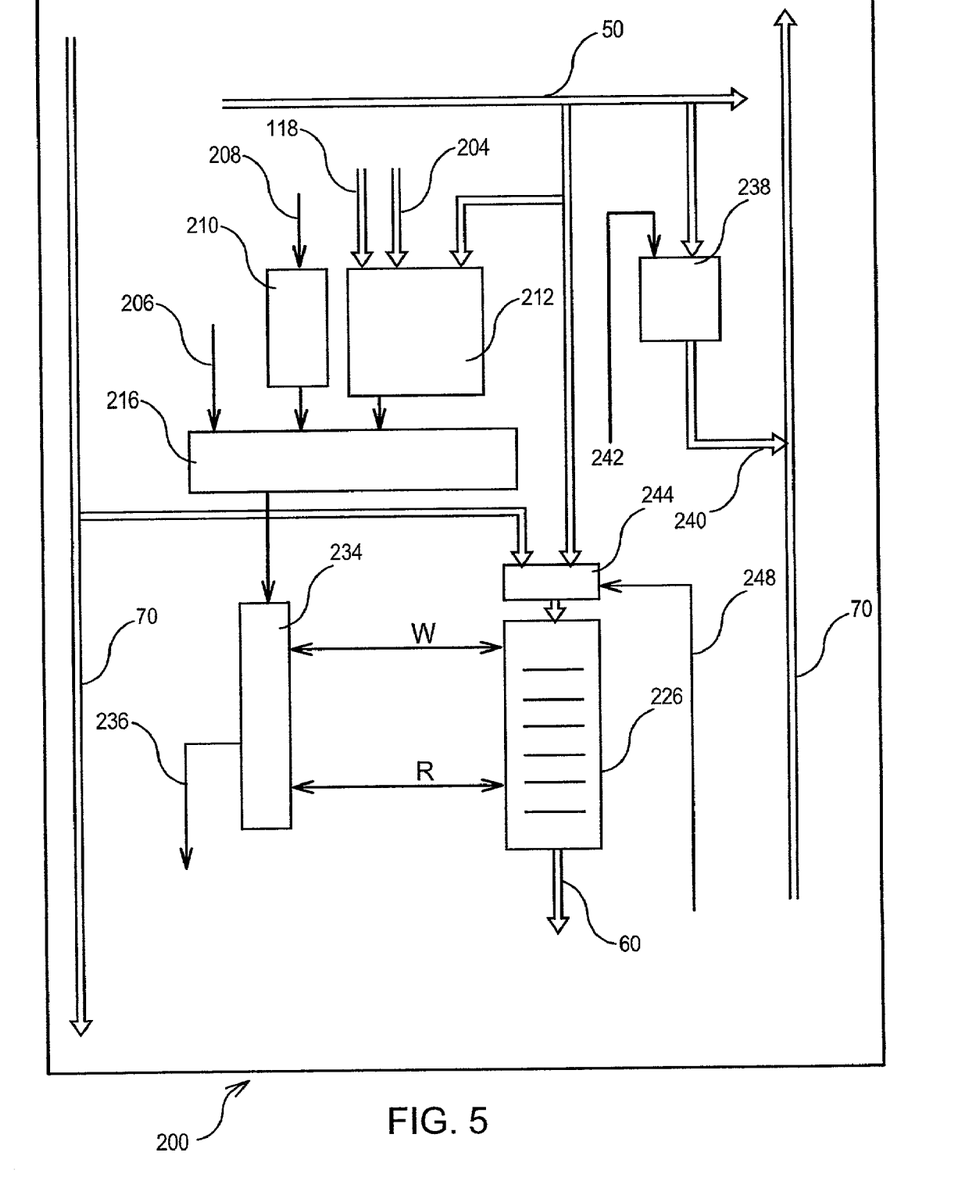
FIG. 5 is a block diagram representing a memory block located at each crosspoint of the packet switch.

On FIG. 5 is represented the memory block (200) composed of:

a memory select block 244.
a header detection block 210,
a header configuration setting and validation control block 212,
a memory controller 234,
a data memory unit 226,
a data selector block 238,
a Header validation control block 216

The header configuration setting and validation control block 212 has the functions of:

Storing the module rank from rank selector 800
Storing the configuration data memory address from configuration interface mechanism 600.
Analyzing the data packet type (Multicast, Unicast . . . etc)
Authorizing (or not) the reception of the incoming data packet according to the destination data packet address.
a) At initialisation time, the header configuration setting block 212 receives the switch module rank from the rank selector 800 through the bus 118. The module rank is needed for determining the global physical address of each output port of the switching system. Each header configuration-setting block attached to the same column output port has the same decoding address. Assuming that each switch module is an 8×8 port module, the $1^{st}$ column corresponding to the output port 1 has the decoding address '0'; the $2^{nd}$ column has the decoding address '1' . . . and so on until the column 8. Note that the switch module could be a m×m port module with m different from 8.

If the switch module is single, then the decoding address on each column is unchanged. But, in port expansion with several modules interconnected together, the $1^{st}$ column of modules has to decode the address range (0–7), the $2^{nd}$ column of modules has to decode the address range (8–15), the $3^{rd}$ column of modules has to decode the range address (16–23), and so on until the last column of modules. If there are n colums of modules, the block 212 assigns an offset of 8×k to the output port address in the module, with k being 0 to n−1.

b) The second function of the header configuration and setting block 212 allows the modifications of the pre-setted internal output port memory address through the configuration interface. This function is used in internal speed expansion mode, where 2 or more output ports or columns have to be combined in order to grow the data throuput of the port. The configuration interface mechanism 600 configures the memory block through the configuration bus 204.

c) The third function of the header configuration and setting block 212 is to detect whether the packet is a multicast address packet. If so, the header of the packet has a specific configuration determining that all the following packets, which have all a specific header, are the packets of a multicast frame. In such a case, the header configuration and setting block 212 analyzes also the 54 bytes of the packet following the header to determine whether the output port associated with the memory block corresponds to one of the output ports to which the multicast frame is addressed d) Header detection block 210 defines the start of each incoming data packet. This block receives clocking signal through the signal 208 at each clock time.

e) Header validation control block 216 uses control signals from block 212, block 210, and validation signal 206 from scheduler 500, to authorize the memory controller 234 to store the incoming data packet into the data memory unit 226.

f) The data validation block 244 selects either the distributed data bus 50 or the overflow data bus 70 depending on the control signal 248 driven by scheduler 500. By default, the distributed data bus 50 is connected to the data memory unit 226 until an overflow is detected.

g) Data memory unit 226 stores and releases the data packets under the control of the memory controller 234.

h) Data Memory controller 234 performs the functions of controlling the address release, enqueue and dequeue mechanisms, generating read and write signals, generating a memory overflow signal 236 to scheduler 500.

i) An overflow data bus 70 (one per output), is connected to all memory blocks, along the internal output data bus 60 in order to reassign the overflow data packet to another memory block. For this, the scheduler 500 activates the signal 242 controlling the overflow connection block 238 which can be an AND circuit connecting the distributed data bus 50 to the overflow data bus 70 through the bus 240. The scheduler takes the decision after receiving flow controls signals 236 from memories connected on the same output port. The decision is to determine the usable memory wherein the overflow data packet can be stored. This is particular useful, due to the fact that the data packet is rerouted to another memory block of the same output port.

Figure 6:
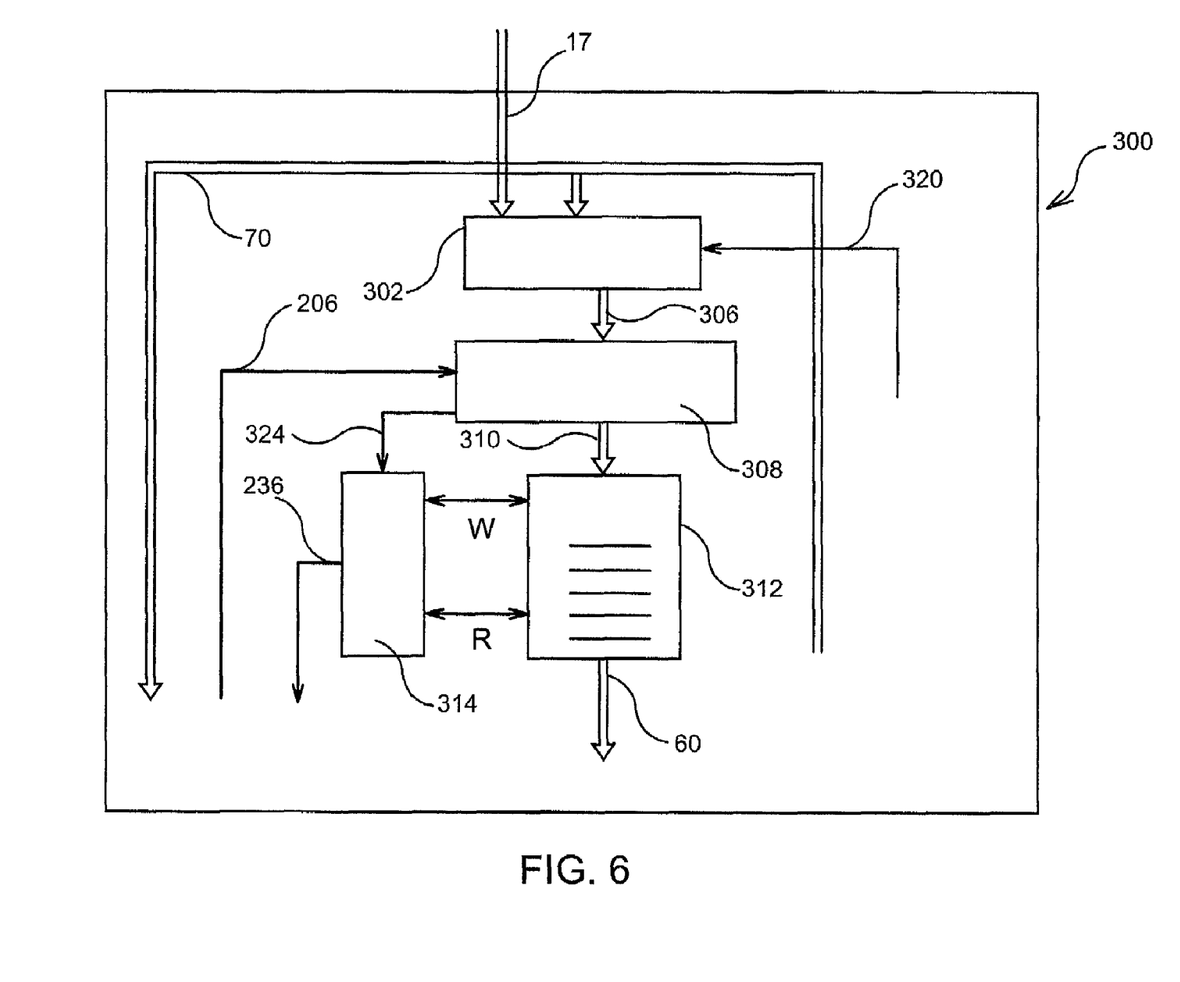
FIG. 6 is a block diagram representing an input expansion data block of the packet switch.

On FIG. 6 is described the input expansion data block 300 which is composed of:

a header processing block 302,
a header validation block 308,
an expansion memory unit 312,
a memory controller 314.

The input expansion bus in 17 connected to the header processing block 302 carries the data packet coming from another switching module in expansion mode. The header processing block 302 is also connected in input to the overflow data bus 70 for receiving an overflow data packet. The header processing module 302 is connected in output to the header validation block 308 by the data bus 306. The function of the header processing block is to select the appropriate data bus, according to the configuration mode line 320 from rank selector 800. This line carries the necessary module rank information.

The header validation block 308 receives control signal validation 206 coming from the scheduler 500. The header validation block 308 signals an incoming data packet to the memory controller 314 through the control signal 324 and sends the data packet to the memory block 312 through the data bus 310.

The main function of the expansion memory unit 312 is to store the incoming data packet coming from the expansion data bus or from the overflow data bus, under the control of memory controller 314 which controls the write/Read operations to the memory, and generates a memory flow control signal 236 to the scheduler 500.

Figure 7:
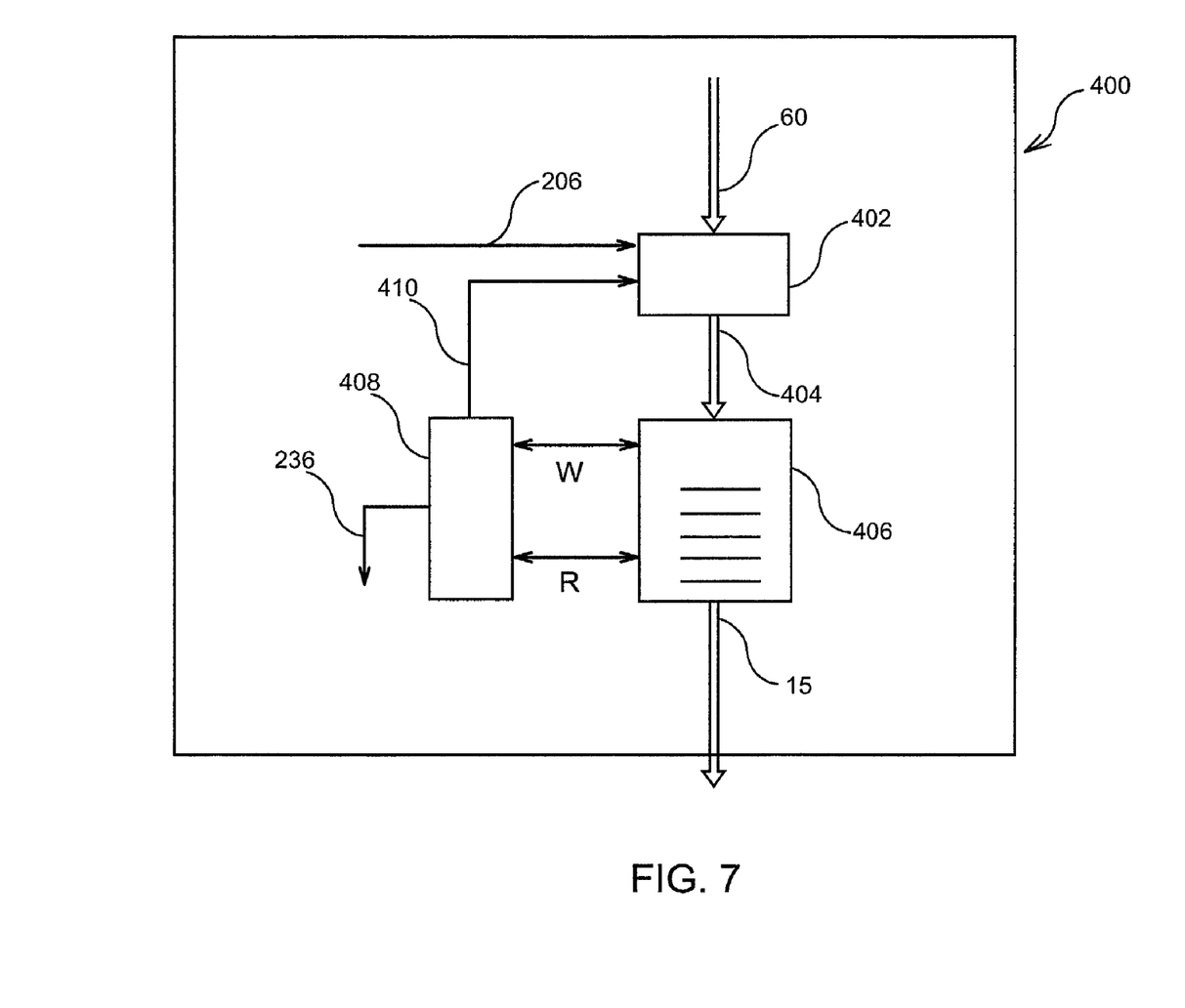
FIG. 7 is a block diagram representing an output data block of the packet switch.

On FIG. 7 is described the output data block 400 which is composed of:

A data selection block 402,
An output memory unit 406,
A memory controller 408,

The function of the output data block 400 is to receive data packets from internal output bus 60, to validate data packets from the internal output bus 60, to store into the output memory unit 406 the incoming data, and to release data packet on the data bus out 15.

The function of the data selection block 402 is to receive the internal output data bus 60, to validate the incoming data packet when receiving validation signal 206 coming from the scheduler, and to activate a validation data signal 410 to the memory controller 408.

The output memory unit 406 connected to the data selection block 402 by the data bus 404, stores incoming data packets under the control of the memory controller 408. The function of the latter is to store the incoming data packets into the memory block, to release data packets from the output memory unit, to control the storing memory address, and to generate a flow control signal 236 to the scheduler 500.

The data packets after being released from the output memory unit 406 by the memory controller, are sent over the output data bus 15.

Scheduler (500)

Figure 8:
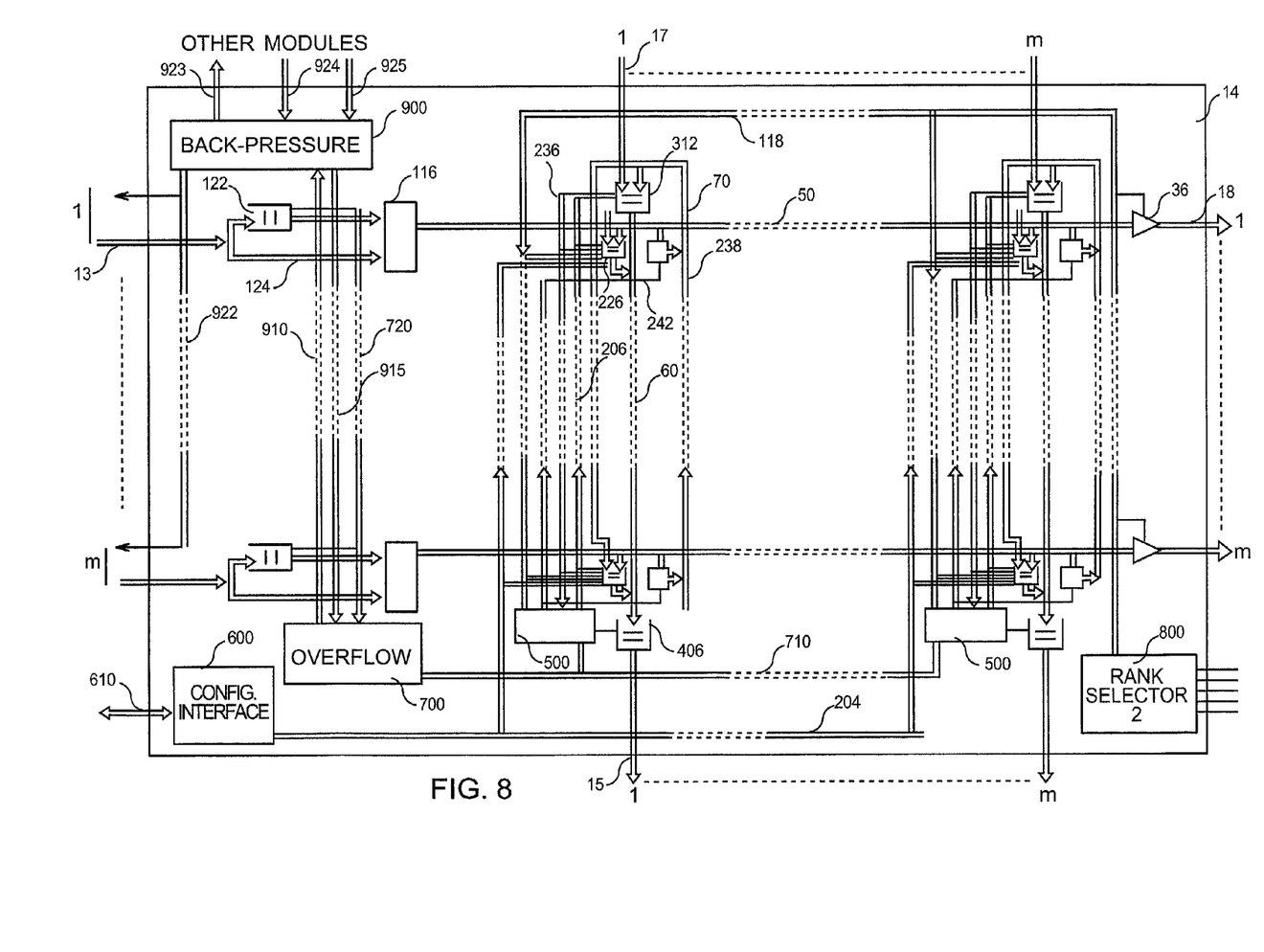
FIG. 8 is a block diagram representing the complete architecture of the packet switch.

An essential feature of the invention is to use a scheduler illustrated in FIG. 3 and FIG. 8, for each output port of the packet switch rather than a centralized scheduling mechanism as in a crossbar switch.

The main functions of the scheduler 500 are:

- To receive the necessary information coming from all attached column memory blocks 200
- To activate the validation of the incoming data packet for the selected memory block,
- To determine the outgoing data packet by choosing the memory block according to a round-robin mechanism. This mechanism can be based on priority selection and/or any other selections.
- To Control the memory overflow,
- To Flow control the output ports,
- To Report flow control signals 710 to an overflow control mechanism 700, and therefore alert a backpressure mechanism 900.

Rank Selector (800)

The rank selector 800 located in the bottom right corner of FIG. 8 is a mechanism using a number of input pins hardwired on the board, that define the module rank in a packet switch including a plurality of switch modules.

In the case of single module, this address is '0'. In the case of port expansion, many switch modules may interconnect together. For the ease of comprehension, it is assumed a 16×16 switch system configuration using four 8×8 switch modules. The 2 modules of the $1^{st}$ column of modules have to be hardwired to '0'. The 2 other modules of the $2^{nd}$ column of modules have to be hardwired to '1'. The same algorithm applies for N×N switch system configuration.

The physical destination address known by the adapters is the final destination address and is contained in the header of each data packets.

Overflow Control

Based upon the overflow signals coming from all memory blocks on lines 236 as illustrated in FIG. 3 and FIG. 8, the scheduler determines the memory blocks which overflow during each data packet time (internal clock time for storing one data packet).

Figure 9:
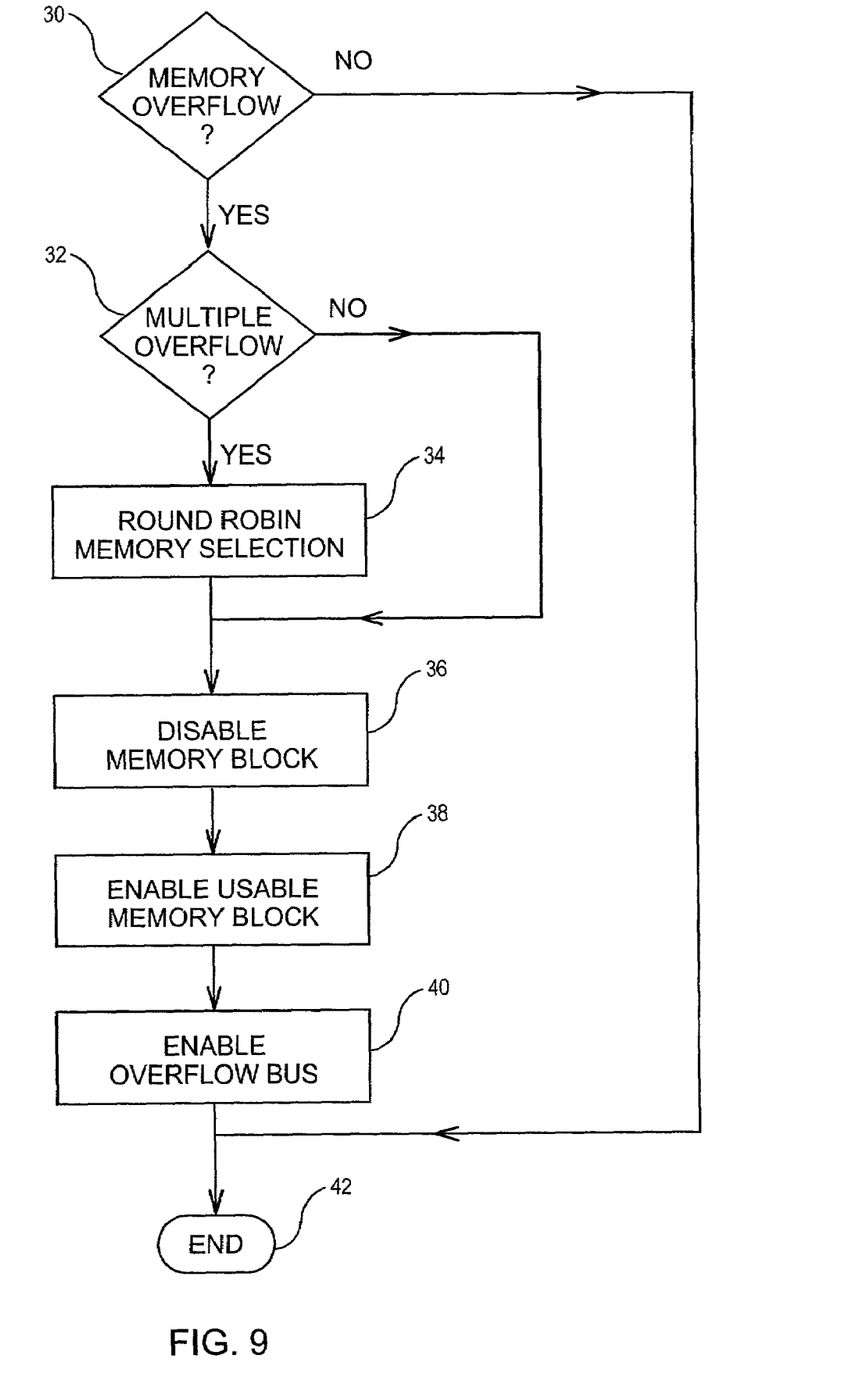
FIG. 9 is a flow chart representing the steps controlled by the scheduler when a single or multiple overflow occur.

As illustrated by the flow chart of FIG. 9, it is first checked by the scheduler whether there is a memory block which overflows (step 30). If so, it is then checked whether it is a multiple overflow (step 32). In case of multiple overflows, the scheduler uses a selection algorithm (generally a round robin selection) to select the appropriate memory block which can receive the next data packet (step 34). Of course, if it is a single overflow, the step of memory selection is not necessary. In such a case or after the selection, the memory block which overflows is disabled by the scheduler on line 206 (step 36) and a usable memory block is enabled by the scheduler on line 248 (step 38). Then, overflow bus 70 is enabled by line 242 from the scheduler to carry the data packet into the data memory unit of the memory block which is validated by line 248 (step 40). When there is no memory overflow (step 30) or after the transfer of the data packet over the overflow bus 70, the process is ended (step 42).

It must be noted that such an overflow processing by a scheduler associated with each output port, presents the advantages of:

- flow controlling the internal data,
- avoiding the loss of the data packet,
- having a better distribution of the data packets, and
- delaying the generation of a backpressure signal as described hereafter only when it is not possible to process normally the memory overflow.

Configuration Interface Mechanism (600)

The configuration interface mechanism 600 located on bottom left of FIG. 8 is the mechanism controlling the configuration of each column output port.

Assuming that the switch is an 8×8 output ports, at the end of the Initialisation, the $1^{st}$ column corresponding to the output port 1 has the decoding address '0'. The $2^{nd}$ column has the decoding address '1' . . . and so on until the column 8. The configuration interface mechanism allows the traffic management to modify the address of each column. As an example the packet switch may have the following configuration:

Port_1: Decoding address '0'
Port_2: Decoding address '1'
Port_3: Decoding address '2'
Port_4: Decoding address '2'
Port_5: Decoding address '4'
Port_6: Decoding address '5'
Port_7: Decoding address '6'
Port_8: Decoding address '6'

This function is used to increase the Internal Speed. The port_3 & Port_4 decode the same incoming data packet, which improves the performances of the adapter. The same applies as Port_7 & Port_8.

The configuration interface mechanism 600 sends information through the bus 204 to the configuration setting and detection block 212 of each memory block of each output port (see FIG. 5). It receives information through bus 610 from traffic management. In case of port expansion (several modules interconnected together), each module is connected to the bus 610.

The traffic management gives through the bus 610, the information about the module physical address, the row/column physical address, and the modified address of the row/column data memory block. The traffic management accesses only one configuration interface 600 at a time.

Back-pressure Mechanism (900)

The back-pressure mechanism 900 located in top left corner of the FIG. 8, has the functions of:

- receiving flow control bus 910 from overflow control block 700,
- generating flow control bus 915 to overflow control block 700,
- receiving flow control information on bus 924 from the right adjacent switch module
- receiving flow control information on bus 925 from bottom adjacent switch module
- generating flow control information on bus 922 to the left adjacent switch module
- Generating flow control information on bus 923 to the top adjacent switch module.

Of course, in a single module configuration there is no information exchanged with other modules. The bus 922, from back-pressure mechanism 900 connected to the inputs ports, is made of n independents signals, one signal per input port.

The generation of a back-pressure signal to the adapters is to stop (or reduce) the flow of the data packets transmitted to the packet switch when there is too much overflow detected by one or several schedulers. The back-pressure signals are generated after receiving flow control information from the overflow mechanism 700 through the bus 910.

When a memory block is not able to store any more data packet, an overflow control signal is sent to the corresponding scheduler through the bus 236. Each scheduler alerts the overflow mechanism 700 through control bus 710. The overflow mechanism receives overflow control signals from all schedulers and informs the back-pressure mechanism 900 through bus 910 to back-pressure the corresponding adapters.

In port expansion configuration, the back-pressure mechanism 900 receives overflow information from the right adjacent switch module, and from the bottom adjacent switch module, and it generates overflow information to the top adjacent switch module.

When back-pressure mechanism 900 receives overflow information from the bottom adjacent switch module, it informs overflow mechanism 700 of its switch module through bus 915, which in turn alerts the corresponding schedulers through bus 710 and requests them to decrease the transmission of the data packets.

When back-pressure mechanism 900 receives overflow information from the right adjacent switch module, it alerts the corresponding input adapters of its switch module through bus 922 and requests Multicast Mechanism An essential feature of the packet switch according to the invention is the multicast mechanism enabling to transmit the same packet to a plurality of output ports without requiring the duplication of the data packet.

A multicast address packet is located just before the multicast frame by the adapter. This multicast address packet which has been added by the adapter, contains also 55 bytes. The first byte is used to indicate that the following packets are multicast packets by setting the three first bits to "100" as already mentioned in FIG. 2 (the other bits are unused). The other 54 bytes of the packet are used for a bit mapping with the output ports of each module defined respectively by each of the 54 bytes. As already mentioned, the header configuration and setting block 212 of the memory block analyzes the 54 bytes of the packet following the header to determine whether the output port associated with the memory block corresponds to one of the output ports to which the multicast frame is addressed.

It must be noted that the number of output ports in a module has been chosen as being 8 corresponding to the number of bits within a byte of 8 bits, but could be different. Likewise, it would be possible to address more than 54 switch modules. In such a case, two or more multicast address packets would be necessary.

Figure 10:
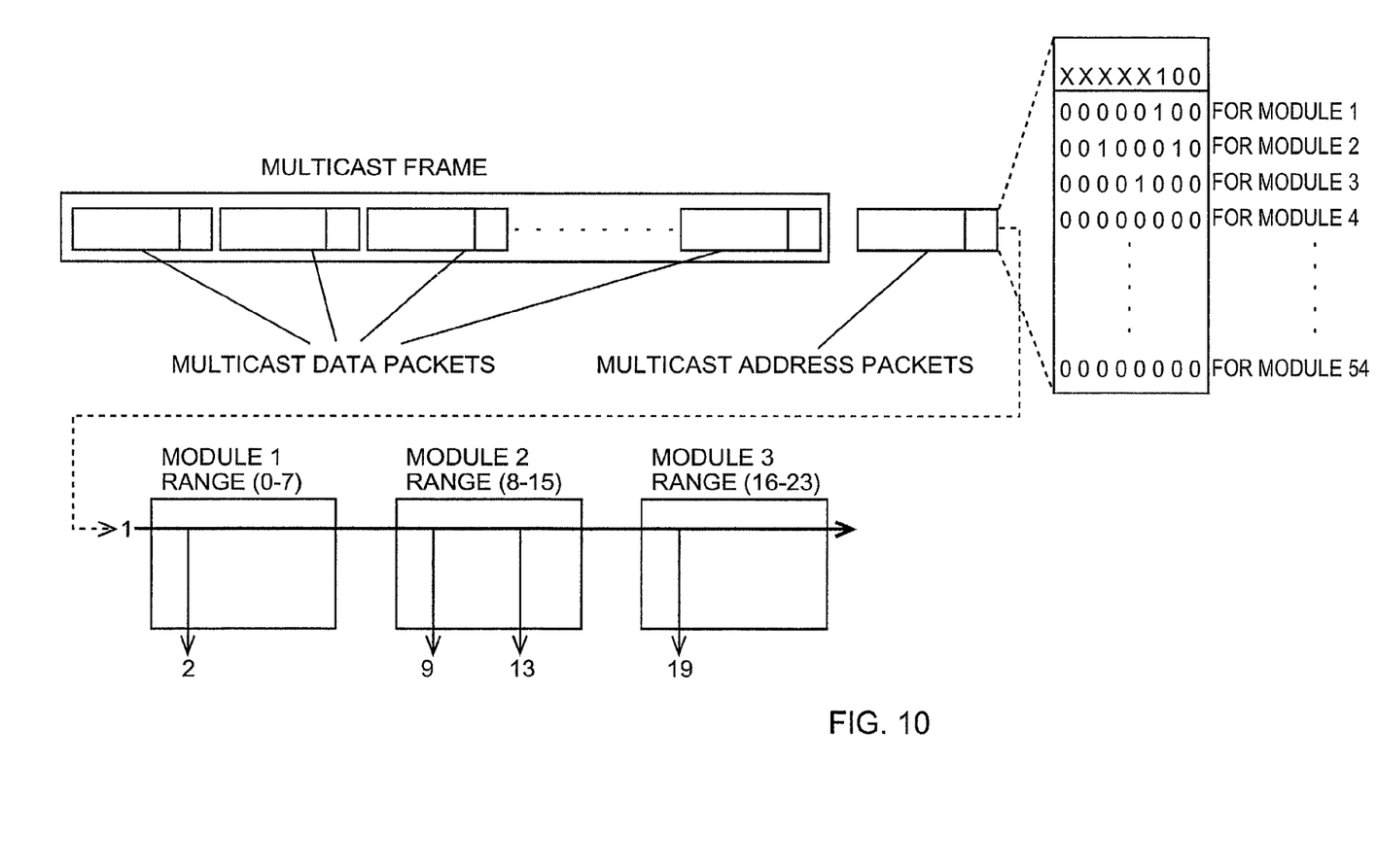
FIG. 10 is a schematic representation of a multicast frame preceded by a multicast address packet which is transmitted to four output ports within three different packet switch modules.

FIG. 10 illustrates an example wherein a multicast frame is addressed to 4 output ports within 3 switch modules. As shown, only byte 1, 2 and 3 corresponding to module 1, module 2 and module 3 have bits which are set to 1. For module 1, as only bit 2 is set to 1, this means that the multicast frame is to be send to output port 2. For module 2, bits 1 and 5 are set to 1 meaning the frame has to be sent to output ports 9 and 13. For module 3, only bit 3 is set to 1 meaning that the frame has to be sent to output port 19.

Note that the packets contained in the multicast frame have a header wherein the three first bits of the first byte are set to "010" as mentioned in FIG. 2.

Of course, if all bits of the 54 bytes allocated to the multicast address in the multicast address packet are set to 1, this means that the following multicast frame is a broadcast frame to be sent to all output ports.

The invention claimed is:

1. Data transmission system comprising:
    a packet switch module comprising a plurality of input ports and a plurality of output ports; and
    a memory block (200) located at each crosspoint of said switch module, wherein each couple of one of said input ports and one of said output ports defines a crosspoint, said memory block including
    memory control means (210, 212, 234) for determining from the header of a received data packet whether said packet is to be forwarded to the output port associated with said crosspoint; and
    a data memory an it (226) for storing at least said data packet into said data memory unit before sending it to said output port,
    wherein said memory control means analyzes all the bytes following said header when said header includes a specific configuration indicating that said packet is a multicast address packet preceding a multicast frame, said multicast address packet including information describing a plurality of destination output ports for said multicast frame, wherein said all bytes following the header are analyzed in order to determine, without the use of a routing table, whether the packets of said multicast frame are to be forwarded to said output port associated with said crosspoint.

2. Data transmission system according to claim 1, further comprising a scheduler (500) associated with each output port for selecting at each clock time a memory block (200) among all memory blocks corresponding to said output port and causing said memory block to forward the data packet stored in the data memory unit (226) of said memory block to said output port when predetermined criteria are met.

3. Data transmission system according to claim 2, wherein said memory control means includes a header validation control block (216) for determining whether the header of said packet received from said input port contains said specific configuration indicating that it is a multicast address packet and a memory controller (234) for storing all the packets of said multicast frame which follows said multicast address packet into said data memory unit (226) if said header validation control block has determined that the packets of said multicast frame are to be forwarded to said output port.

4. Data transmission system according to claim 3, wherein said scheduler (500) sends a validation signal (206) to id header validation control block (216) to authorize said memory controller (234) to store said data packet into said data memory unit (226).

5. Data transmission system according to claim 4, further comprising an output data block (400) connected to each output port for storing a data packet received from any memory block (200) and transmitting said data packet to said output port tinder the control of said scheduler (500).

6. Data transmission system according to claim 5, wherein said output data block (400) includes a data selection block (402) for validating said data packet after receiving a validating signal (206) from said scheduler (500), an output memory unit (406) for storing said data packet and a memory controller (408) for controlling the operation of storing said data packet into said output memory unit and the operation of reading said output memory unit for transmitting said data packet to said output port.

7. Data transmission system according to claim 6, wherein said packet switch (14) includes a plurality of switch modules, each byte of said multicast address packet following said header being associated with one of said switch modules and defining the addresses of the output ports of said module to which said multicast frame is to be forwarded.

8. Data transmission system according to claim 7, wherein said packet switch (14) includes a plurality of switch modules and wherein each down switch module includes for each output port an input expansion data block (300) for buffering a data packet received from an expansion bus in (17) connected to an up switch module and corresponding to the same output port as said output port of said down switch module.

9. Data transmission system according to claim 8, wherein said input expansion data block (300) includes an expansion memory unit (312) for buffering said data packet received from said expansion bus in (17), a header validation block (308) for determining whether the header of said data packet contains the address of the output port associated with said crosspoint and a memory controller (314) for storing said data packet into said expansion memory unit and reading said expansion memory unit to forward it to said output port of said down switch module.

10. Data transmission system according to claim 9, wherein said scheduler (500) sends a validation signal (206) to said header validation block (308) to authorize said memory controller (314) to store said data packet into said expansion memory unit (312).

11. Data transmission system according to any one of claims 1 to 10, wherein an overflow signal (236) is sent by said memory block (200) to said scheduler (500) when said memory block overflows.

12. Data transmission system according to claim 11, further comprising an overflow bus (70) to transport said data packet to said memory block (200) corresponding to said output port after that said scheduler (500) has prevented said data packet from being stored into said memory block which overflows and has selected and validated another memory block which does not overflow.

13. Data transmission system according to claim 1, further comprising a back-pressure mechanism (900) adapted to send back-pressure signals (922) to input adapters for requesting them to reduce the flow of data packets transmitted to said packet switch (14) when there is too much overflow detected by each scheduler of said packet switch.

14. Data transmission system according to claim 13, further comprising an overflow mechanism adapted to receive overflow control signals (710) from the schedulers of said packet switch (14) when there is too much overflow and to transmit an overflow signal to said back-pressure mechanism (900).

15. Data transmission system according to any one of claims 1 to 10, wherein the header of said multicast address packet includes one byte wherein the last significant bits are "100".

16. Data transmission system according to claim 15, wherein the header of any data packet which is not a multicast address packet includes two bytes in which the first byte contains an identification field and the second byte contains a module address field when said packet switch (14) comprises several packet switch modules.

17. A data transmission system including:
a switch module having at least two crosspoints;
a memory operatively coupled to each one of the at least two crosspoints; and
a plurality of memory controllers, one of each operatively coupled to each one of the memory, said memory controllers examining a header of a data packet which is forwarded to output ports associated with the coupled crosspoint and analyzing all the bytes following said header when said header includes a specific configuration indicating that said packet is a multicast address packet preceding a multicast frame, said multicast address packet including information describing a plurality of destination output ports for said multicast frame, wherein said all bytes following the header are analyzed in order to determine, without the use of a routing table, whether the packets of said multicast frame are to be forwarded to said output port associated with the coupled crosspoint.

18. The data transmission system of claim 17 further including at least two adapters operatively coupled to the switch module.

19. The data transmission system of claim 18 further including at least one LAN operatively coupled to each of the adapters.

20. Data transmission system comprising:
a packet switch module;
a memory block (200) located at each crosspoint of said switch module, said memory block including
memory control means (210, 212, 234) for determining from the header of a data packet whether said packet is to be forwarded to the output port associated with said crosspoint;
a data memory unit (226) for storing at least said data packet into said data memory unit before sending it to said output port;
a scheduler (500) associated with each output port for selecting at each clock time a memory block (200) among all memory blocks corresponding to said output port and causing said memory block to forward the data packet stored in the data memory unit (226) of said memory block to said output port when predetermined criteria are met, wherein an overflow signal (236) is sent by said memory block (200) to said scheduler (500) when said memory block overflows; and
an overflow bus (70) to transport said data packet to said memory block (200) corresponding to said output port after said scheduler (500) has prevented said data packet from being stored into said memory block which overflows and has selected and validated another memory block which does not overflow,
wherein said memory control means analyzes all the bytes following said header when said header includes a specific configuration indicating that said packet is a multicast address packet preceding a multicast frame in order to determine whether the packets of said multicast frame are to be forwarded to said output port.

* * * * *